United States Patent [19]

Snedeker

[11] Patent Number: 5,087,086
[45] Date of Patent: Feb. 11, 1992

[54] QUICK CONNECT COUPLING WITH PRESSURE RELIEF

[75] Inventor: Clarke R. Snedeker, Lockport, N.Y.

[73] Assignee: General Motors Corporation, Detroit, Mich.

[21] Appl. No.: 699,121

[22] Filed: May 13, 1991

[51] Int. Cl.⁵ .............................................. F16L 21/02
[52] U.S. Cl. .................................. 285/361; 285/924; 285/377
[58] Field of Search ............... 285/361, 362, 377, 376, 285/924; 251/149.6; 137/212

[56] References Cited

U.S. PATENT DOCUMENTS

| 807,417 | 12/1905 | Caskey | 285/377 |
|---|---|---|---|
| 1,221,935 | 4/1917 | White . | |
| 1,232,193 | 7/1917 | Bowes, Jr. . | |
| 1,274,406 | 8/1918 | Frazier et al. . | |
| 1,430,558 | 10/1922 | Jimerson . | |
| 1,580,694 | 4/1926 | Smith | 285/924 |
| 1,890,011 | 12/1932 | Wirz et al. | 285/924 |
| 2,265,267 | 12/1941 | Cowles . | |
| 4,253,683 | 3/1981 | Jentsch et al. | 285/924 |
| 4,437,647 | 3/1984 | Cruse | 285/924 |
| 4,546,956 | 10/1985 | Moberg | 285/377 |
| 4,842,309 | 6/1989 | La Vene et al. | 285/362 |

Primary Examiner—Eric K. Nicholson
Attorney, Agent, or Firm—Ronald L. Phillips

[57] ABSTRACT

A coupling has first and second tube portions joined by a control collar that is rotatable to axially position the first and second tube portions in an installed position, a locked position and in a blow-off position. In the locked position, the tube portions are axially inserted and rotated and locked together by a biasing spring against separation and an O-ring member on one tube portion seals against the other tube portion to seal the tube portions together to prevent fluid leakage therefrom when in their locked position. The other tube portion includes a relief port which is opened for safety blow-off of pressure when the one tube portion is positioned in the blow-off position.

4 Claims, 3 Drawing Sheets

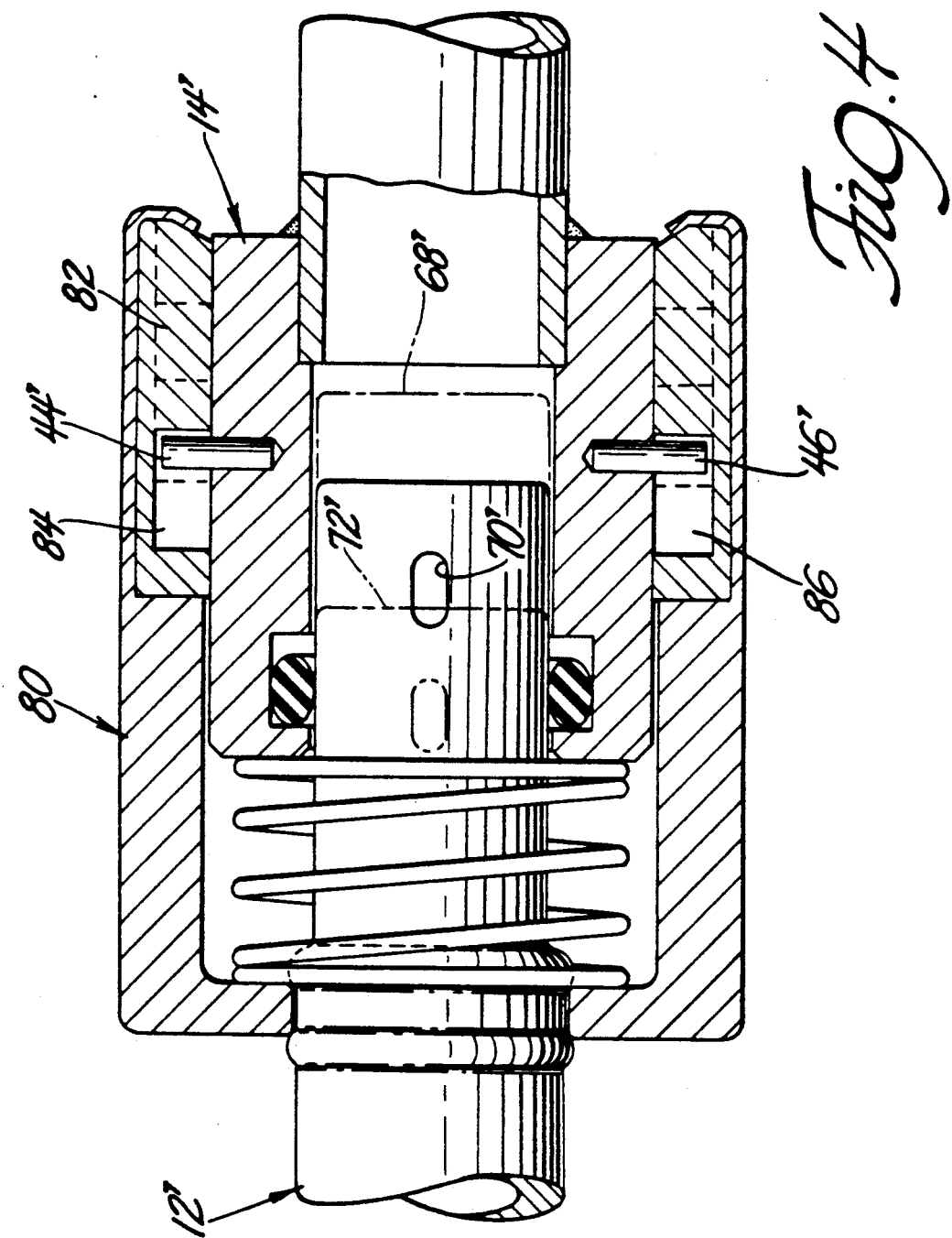

QUICK CONNECT COUPLING WITH PRESSURE RELIEF

FIELD OF THE INVENTION

This invention relates to tube couplings and more particularly to tube couplings for use in pressurized systems such as vehicular air conditioning refrigerant systems.

BACKGROUND OF THE INVENTION

Smaller engine compartments have restricted the available space for mounting accessory devices and systems. In particular it has been a problem to provide enough space to disconnect and connect screw fittings for joining tube segments of a refrigerant system used in vehicular air conditioning. Such screw fittings require use of wrenches to turn the fittings for fastening them together and for disconnecting them to make necessary repairs. The use of wrenches requires a radius turning space that is not always available.

Another problem with such fittings is that the system is often under pressure which is relieved when the tube couplings are broken.

Prior art couplings are known which can be connected by manual insertion and rotation so as to interconnect the tube portions by use of lug ears such as are shown in U.S. Pat. Nos. 1,221,935; 1,232,193; 1,274,406; 1,430,558; and 2,265,267. These couplings, however, do not provide for interlock mechanism which can be visually aligned from the outside of the coupling components. Furthermore, such couplings do not provide for a control collar with a cam surface which will align a relief port on one of the tubes to relieve pressure in the connected tube portions before they are fully separated.

Other prior art couplings have a cam groove on a tube which will receive a tab on another tube for joining the tubes together when the tubes are relatively rotated while applying a connecting force so as to cause the tabs to track within the cam slot to an offset interlock position therein. While suitable for their intended purpose such couplings, they do not provide a cam slot configured to provide a relief surface which will locate a relief port on one of the tubes to relieve pressure in the connected tube portions before they are fully separated. Examples of such couplings include U.S. Pat. Nos. 1,657,488; 1,744,367; 1,938,571; 4,632,433 and 4,909,545.

SUMMARY OF THE INVENTION

The present invention includes a coupling which will permit the assembly of high pressure tubes without the need for wrenches or other torquing devices and includes a control collar having a cam slot that receives a cam follower pin on a first tube that carries a coupling seal and which is positioned on rotation of the control collar into a lock position and a blow-off position. A second tube is inserted into a sealed relationship with the first tube. The second tube has a relief port therein that will be opened when the first tube is in its blow-off position.

A feature of the present invention is to interconnect the control collar on a tube for free rotation relative thereto while being axially locked thereagainst and to locate a spring within the control collar for biasing the first and second tubes apart for holding them in a lock position in which a seal is maintained therebetween for sealing high pressure fluids; the spring is compressible to allow the control collar to rotate and index to a blow-off position in which the relief port is opened to relieve high pressure from within the coupling before it is separated.

An object of the present invention is to provide an improved high pressure coupling suitable for use in an air conditioning tube coupling having first and second tube portions joined together by axial insertion into one another and relative rotation therebetween and wherein one of the tube portions has an outer surface and relief port in the end thereof; a control collar is connected to the one tube portion for free relative rotation with respect thereto while being secured against axial movement thereon; the control collar is telescopingly received on the other tube portion and has cam slots including a lock portion and a pressure relief portion; a spring is located within the control collar for applying an outwardly directed biasing force on the other tube portion when it is inserted into the control collar; the other tube portion has an annular groove on the inboard end thereof and an O-ring seal supported in the annular groove is adapted to engage and seal the outer surface of the one male tube portion for preventing escape of fluid through the relief port when the tube portions are fully assembled; a cam follower on the other tube portion is engageable with the cam slots when the other tube portion is inserted into the control collar and rotated with respect thereto to axially position the one tube portion in a first full installation position and which is positioned when in a blow-off position of the control collar to axially position the relief port to relieve high pressure from the coupling before it is disconnected.

Another object is to provide a high pressure tube coupling suitable for use in a vehicular air conditioning refrigerant circuit, the tube coupling has a first hollow male tube portion and a second hollow male tube portion and the first hollow male tube portion having an outer surface and relief port in the end thereof communicating the interior of first hollow male tube portion with the outer surface; a lock groove is provided in the outer surface; a control collar has a flange portion thereon seated in the lock groove and a hollow cylindrical portion of the control collar is telescopingly received on the second hollow male tube portion. The control collar has a cam slot including an axially disposed entrance end, a blow-off surface portion and a lock surface portion; a coil spring is located in surrounding relationship to the first hollow male tube portion having one end thereof engaged with the control collar and having the opposite end engaged with the second hollow male tube portion when the second hollow male tube portion is inserted into the control collar. The coil spring is operative to apply an outwardly directed biasing force on the second hollow male tube portion; the second hollow male tube portion has an annular groove on the inboard end thereof and an O-ring seal is supported in the annular groove and is adapted to engage and seal the outer surface of the first hollow male tube portion; cam follower pins on the second hollow male tube portion engage the cam surface when the second hollow male tube portion is inserted into the control collar and rotated with respect to the control collar to axially position the first tube portion in a first full installation position in which the coil spring is fully compressed; the coil spring holds the second hollow male tube portion in a first axial position in which the first hollow male tube portion has its relief port sealed by the O-ring. The cam follower pins are engaged with the lock surface portion to prevent separation between the first and second hollow male tube portions; and when the cam follower engages the blow-off portion, the second hollow male tube portion is in a partially released position in which the O-ring is located axially outwardly of the first hollow male tube portion to allow pressure within the connected first and second hollow male tube portions to relieve through the relief port for escape between the control collar and the second hollow male tube portion.

Other features, objects and advantages of the present invention will be readily appreciated as the same become better understood by reference to the following description when considered in connection with the accompanying drawings wherein:

BRIEF DESCRIPTION OF THE DRAWINGS

is a fragmentary sectional view taken along the line 3—3 of FIG. 2 showing a cam slot in a control collar of the present invention; and FIG. 4 is a longitudinal sectional view of another embodiment of the invention.

DETAILED DESCRIPTION OF PREFERRED EMBODIMENTS OF THE PRESENT INVENTION

Figure 1:
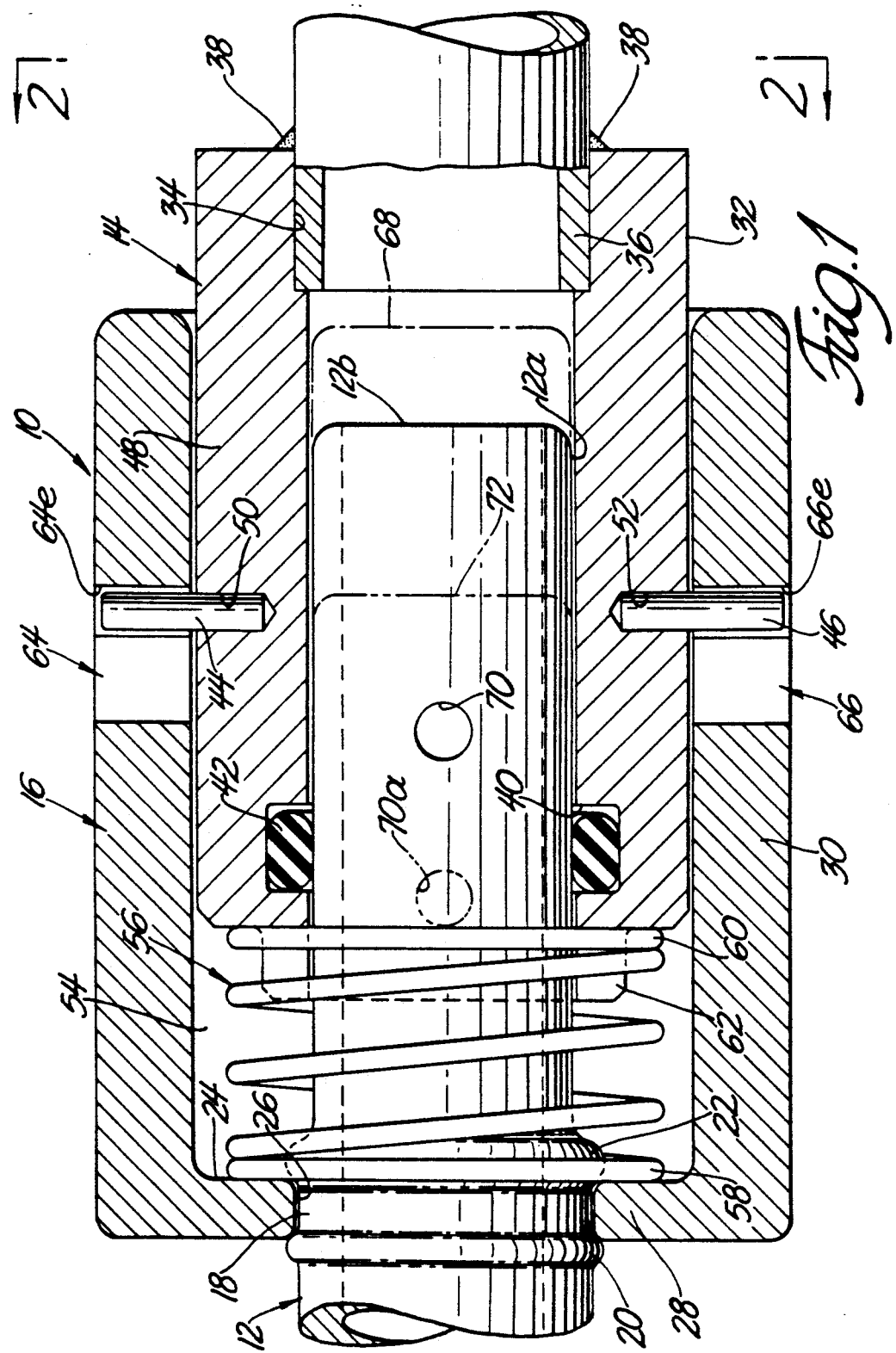
FIG. 1 is a longitudinal sectional view of a coupling constructed in accordance with the present invention.

Referring now to FIG. 1, a coupling assembly 10 is shown including a first hollow male tube member 12 and a second hollow male tube member 14. The coupling assembly 10 further includes a control collar 16 which is connected to the tube member 12. More particularly, the tube member 12 has an outer annular groove 18 formed therein by two spaced circular ribs 20, 22 in the outer surface of the tube member 12. The control collar 16 has a closed end 24 thereon with an opening 26 therein which defines an annular flange 28 that fits in the groove 18 to allow the control collar 16 to rotate with respect to the tube member 12. The circular ribs 20, 22 lock the closed end 24 on the tube member 12 against axial movement relative thereto while permitting relative rotation therebetween.

The control collar 16 further includes a cylindrical hollow extension 30 thereon that is telescoped over the outer surface 32 of the second hollow male tube member 14. The second hollow male tube member 14 includes an outboard bore 34 therein in which is seated a tube 36 that is fixed therein by suitable fastening means such as a weld bead 38 formed around the outer circumference of the high pressure tube 36 at the end thereof where it enters the bore 34.

The second hollow male tube member 14 has an annular groove 40 at the inboard end thereof in which is seated an O-ring seal 42 of elastomeric material. The O-ring seal 42 sealingly engages the outer surface 12a of the first tube member 12 when the coupling assembly 10 is connected as shown in FIG. 1. The second hollow male tube member 32 also carries a pair of diametrically opposed cam follower pins 44, 46 seated in the tube wall 48 at holes 50, 52 respectively.

The control collar 16 and tubes 12, 14 when assembled, form a cavity 54 which is open to atmosphere between the collar 16 and the outer surface 32 of the second tube 14 and by leakage across the annular locking groove 18. A coil spring 56 is located within the cavity 54 in surrounding relationship to the tube 12 and one end 58 of the coil spring 56 is secured to the rib 22 and the opposite end 60 thereof is arranged to receive a pilot nose 62 on the inboard end of the second tube 14 when assembled in the coupling. The coil spring 56 is a compression spring which applies a biasing force on the second tube 14 to hold it in a locked position in the coupling assembly 10 as will be described in greater detail.

The control collar 16 has two diametrically opposed cam slots 64, 66 which receive the cam follower pins 44, 46 respectively. The cam slot 64 is shown in segments 66a-66d which correspond to the segments 64a-64d shown in FIG. 3A. Cam slot 64 includes entrance and transition portions 64a; a pressure relief surface portion 64b; an inclined transistor or helical surface portion 64c and a re-entrant lock surface portion 64d. Rotation of the control collar 16 shifts the second tube 4 axially inwardly of the collar 16 to cause the end 12b of the first tube 12 to enter the interior of the second tube 14. When the tubes 12, 14 are inserted axially of one another, the cam follower pins 44, 46 will be piloted by the externally visible entrances 64a, 66a. Following initial insertion, the collar 16 is relatively rotated to draw the first tube 12 further into the second tube to a furthest forward assembly position shown at line 68 in FIG. 1. At this position the coil spring 56 is compressed and the cam follower pins 44, 46 are located in the re-entrant lock portions 64d, 66d of the cam slots 64, 66. Once aligned with the lock portions 64d, 66d the cam follower pins 64, 66 are free to move against lock surfaces 64e, 66e at which point the coupling tubes 12, 14 assume their locked position which is illustrated in solid lines in FIG. 1.

Figure 3:
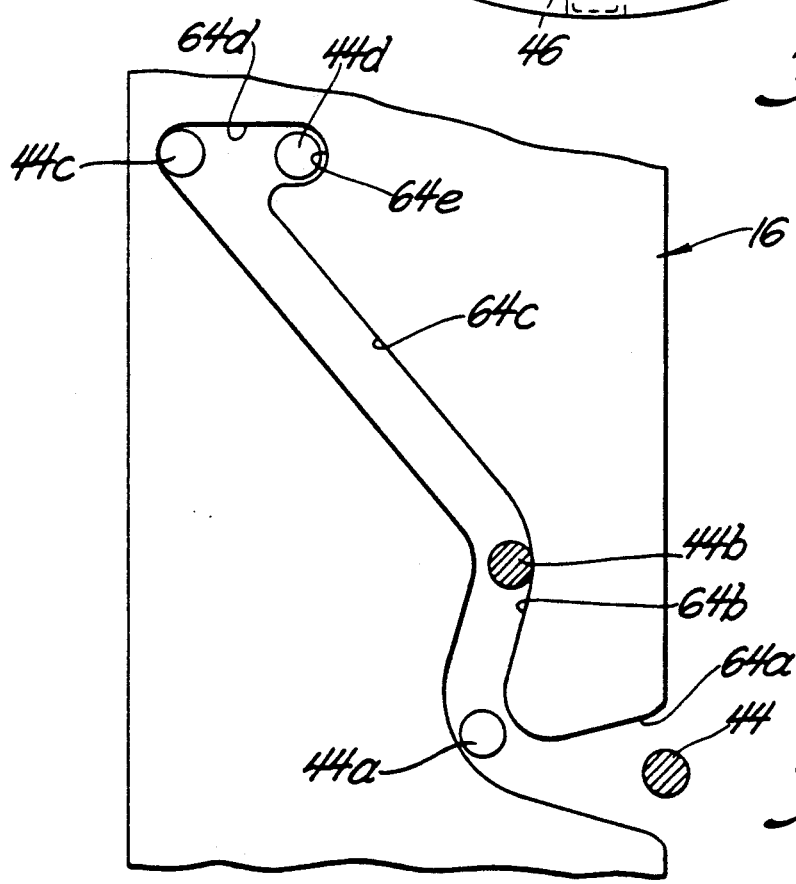

In accordance with one aspect of the present invention, when the tubes 12, 14 are in their lock position the O-ring seal 42 is located to seal a relief port 70 through the wall of the first tube 12 adjacent the inboard end 12a thereof. When the relief port 70 is sealed the tubes 12, 14 are joined to define a sealed joint in the high pressure circuit, e.g., the refrigerant circuit of an vehicle air conditioning system. The sealed position is the same as that shown in the solid line position of FIG. 1 and interposes the O-ring seal between the relief port 70 and the cavity 54. The control positions of the follower pins 44, 46 are shown in FIG. 3 for pin 44 (the same positions apply to follower pin 46 in the cam slot 66). The entrant position is shown at 44a. The blow-off position is shown at 44b, the full insert position is shown at 44c and the lock position is shown at 44d.

One problem with high pressure couplings is how to assure positive relief of the pressure before the coupling is disconnected. In the illustrated embodiment the coupling is depressurized by rotating the control collar 16 in the counterclockwise direction as viewed in FIG. 2 until the follower pins 42, 44 are seated in the depressions 64b, 66b defining the relief portions. At this position the end of the first tube 12 is located at the line 72 which locates the relief port 70 inboard of the O-ring seal 42, as shown in broken lines at 70a, so that pressure within the tube portions 12, 14 will escape into the cavity 54.

Figure 2:
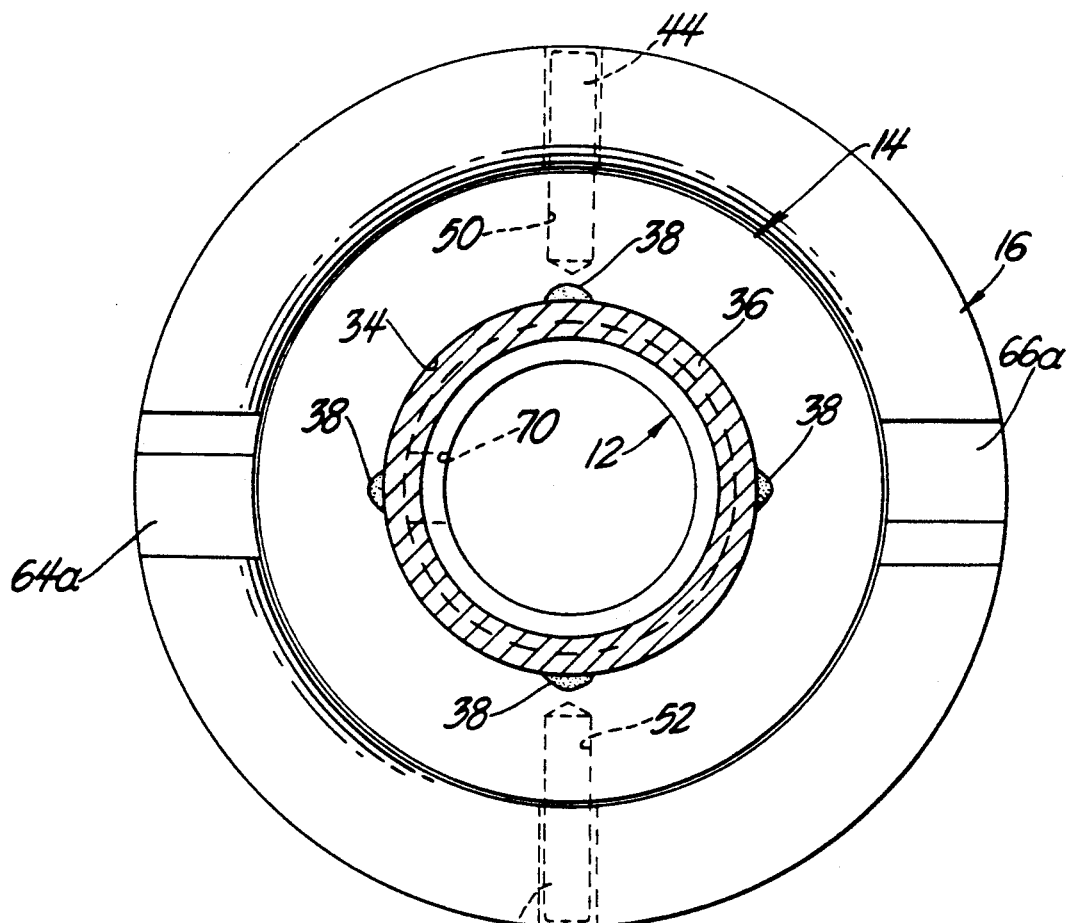
FIG. 2 is an end elevational view of the coupling in FIG. 1 looking in the direction of the arrows 2—2.

In another embodiment as shown in FIG. 4, like components are shown with primed referenced numerals which function as do their counterparts in the embodiment of FIGS. 1-3. In this embodiment a control collar 80 is illustrated in which a plastic insert 82 is inserted. The plastic insert has cam slots 84, 86 which receive the pins 44', 46' for controlling the relative position between the first and second tube portions 12', 14'. The plastic insert 82 in the preferred form is a molded nylon insert having the pin runs or cam slots 84, 86 formed therein by molding. The cam slots 84, 86 have the same general shape as cam slots 64, 66 and function in the same way to position the tube portion in its furthest forward insert position at 68'; in its lock position shown in solid line; and in its blow-off position at 72'.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims, the invention may be practiced otherwise than as specifically described.

What is claimed is:

1. A tube coupling having a first tube and a second tube joined together by axial insertion into one another and relative rotation therebetween characterized by:

said first tube having an outer surface and relief port in the end thereof communicating the interior of said first tube with said outer surface;

a control collar having a flange portion thereon secured to said first tube and a hollow cylindrical portion telescopingly receivable on said second tube and further having cam surface means thereon including a lock portion and a pressure relief portion;

cam follower means on said second tube selectively engageable with said cam surface means at said pressure relief portion and said lock portion when said second tube is inserted into said control collar and rotated with respect to said control collar to axially position said first tube in blow-off and lock positions;

means located within said control collar for applying an outwardly directed biasing force on said second tube when it is inserted into said control collar to hold said cam follower means against said lock portion to prevent separation of said first and second tubes;

said second tube having an annular groove and an O-ring seal supported in said annular groove adapted to engage and seal the outer surface of said first tube for preventing escape of fluid through said relief port when said first tube is in its lock position; said O-ring seal positioned outboard of said relief port when said first tube is in its blow-off position to relieve pressure from said first and second tubes before they are fully separated.

2. A high pressure tube coupling having a first tube and a second tube characterized by:

said first tube having an outer surface and relief port in the end thereof communicating the interior of said first tube with said outer surface and a lock groove portion in said outer surface;

a control collar having a flange portion thereon seated in said lock groove and a hollow cylindrical portion telescopingly receivable on said second tube and further having a cam groove including an axially disposed entrance end, a relief surface portion and a lock surface portion;

a coil spring located in surrounding relationship to said first tube having one end thereof engaged with said control collar and having the opposite end engaged with said second tube when said second tube is inserted into said control collar and operative to apply an outwardly directed biasing force on said second tube portion;

said second tube portion having an annular groove and an O-ring seal supported in said annular groove adapted to engage and seal the outer surface of said first tube;

cam follower pins on said second tube engageable with said cam groove when said second tube is inserted into said control collar and rotated with respect to said control collar to axially position said first tube in a first full installation position in which said coil spring is fully compressed;

said coil spring operative to hold said second tube in a first axial position in which said relief port is sealed by said O-ring seal and in which said cam follower pins are engaged with said lock surface portion to prevent separation of said first tube from said second tube; and said cam follower pins engageable with said relief surface portion for positioning said second tube in a partially released position in which said O-ring seal is located axially outwardly of said first tube to open said relief port so as to relieve pressure from within said first and second tubes.

3. A high pressure tube coupling having a first tube and a second tube portion characterized by:

said first tube having an outer surface and relief port in the end thereof communicating the interior of said first hollow male tube portion with said outer surface;

a control collar having a flange portion thereon and a hollow cylindrical portion telescopingly received on said second tube, said control collar further having a cam surface including an entrance portion, a relief portion and a lock portion;

an ambient pressure chamber formed between said first tube portion and said control collar; biasing means located in said ambient pressure chamber engageable with said second tube when said second tube is inserted into said control collar and operative to apply an outwardly directed biasing force on said second tube;

said second tube having an annular groove on the inboard end thereof and an O-ring seal supported in said annular groove adapted to engage and seal the outer surface of said first tube;

a cam follower on said second tube portion engageable with said cam surface when said second tube is inserted into said control collar and rotatable with respect to said control collar to axially position said first tube in a full installation position in which said biasing means engages said second tube to bias it outwardly of said control collar;

said biasing means operative to hold said second tube in a first axial position in which said first tube has said relief port sealed by said O-ring and in which said cam follower is engaged with said lock portion to prevent separation between said first tube and said second tube; and said cam follower positioning said second tube in a partially released position in which said O-ring is located axially outwardly of said first tube to allow pressure within said first and second tubes to relieve through said ambient chamber.

4. A high pressure fluid tube coupling having a first hollow male tube portion and a second hollow male tube portion characterized by:

said first hollow male tube portion having an outer surface and relief port in the end thereof communicating the interior of said first hollow male tube portion with said outer surface and an outer annular lock groove formed axially inward of the end thereof;

a control collar having a flange portion thereon seated in said annular lock groove and a hollow cylindrical portion telescopingly received on said second hollow male tube portion and further having a stepped cam surface including an entrance portion, a relief portion and a lock portion; said stepped cam surface having a first transition segment joining said entrance portion to said relief portion and a second transition segment joining said relief portion to said lock portion;

a coil spring located in surrounding relationship to said first hollow male tube portion having one end thereof engaged with said control collar and having the opposite end engaged with said second hollow male tube portion when said second hollow male tube portion is inserted into said control collar and operative to apply an outwardly directed biasing force on said second hollow male tube portion;

said second hollow male tube portion having an annular groove on the inboard end thereof and an O-ring seal supported in said annular groove adapted to engage and seal the outer surface of said first hollow male tube portion;

cam follower pins on said second hollow male tube portion engageable with said control collar at said cam surface when said second hollow male tube portion is inserted into said control collar and rotatable with respect to said control collar to axially position said first hollow male tube portion in a first full installation position in which said coil spring is fully compressed;

said coil spring operative to hold said second hollow male tube portion in a first axial position in which said first hollow male tube portion has its relief port sealed by said O-ring and in which said cam follower pins are engaged with said lock portion to prevent separation between said first hollow male tube portion and said second hollow male tube portion; and said cam follower positioning said second hollow male tube portion in a partially released position in which said O-ring is located axially outwardly of said male tube portion to allow pressure within said connected first and second hollow male tube portions to relieve through said relief port for escape between said control collar and said second hollow male tube portion.

* * * * *